US012320506B1

(12) United States Patent
Tarasoff et al.

(10) Patent No.: US 12,320,506 B1
(45) Date of Patent: Jun. 3, 2025

(54) GUIDELIGHT MARKER DEVICE

(71) Applicants: David Tarasoff, Calgary (CA); Reena Tarasoff, Calgary (CA)

(72) Inventors: David Tarasoff, Calgary (CA); Reena Tarasoff, Calgary (CA)

( * ) Notice: Subject to any disclaimer, the term of this patent is extended or adjusted under 35 U.S.C. 154(b) by 0 days.

(21) Appl. No.: 18/440,871

(22) Filed: Feb. 13, 2024

(51) Int. Cl.

| | |
|---|---|
| ***F21V 21/08*** | (2006.01) |
| ***F21V 21/096*** | (2006.01) |
| ***F21V 23/02*** | (2006.01) |
| *F21Y 113/13* | (2016.01) |
| *F21Y 115/10* | (2016.01) |

(52) U.S. Cl.
CPC ........ *F21V 21/096* (2013.01); *F21V 21/0832* (2013.01); *F21Y 2113/13* (2016.08); *F21Y 2115/10* (2016.08)

(58) Field of Classification Search
CPC ............... F21V 21/096; F21V 21/0832; F21Y 2113/13; F21Y 2115/10
See application file for complete search history.

(56) References Cited

U.S. PATENT DOCUMENTS

| | | | | |
|---|---|---|---|---|
| 5,915,852 | A | 6/1999 | Rogers | |
| 6,243,958 | B1 | 6/2001 | Ringley, Jr. | |
| 7,455,419 | B2 | 11/2008 | Helget et al. | |
| 8,833,961 | B2 | 9/2014 | Chen | |
| 10,030,855 | B1 * | 7/2018 | Khubani | F21L 4/027 |
| 11,988,343 | B2 * | 5/2024 | Cao | F21V 23/06 |
| 2007/0097505 | A1 | 5/2007 | Desjardin | |
| 2008/0120859 | A1 | 5/2008 | Eversdijk | |
| 2011/0235313 | A1 * | 9/2011 | Canella | F21V 21/08 362/382 |
| 2012/0236548 | A1 * | 9/2012 | Wilson | F21V 21/0832 362/183 |
| 2018/0231192 | A1 | 8/2018 | Bian | |
| 2022/0139267 | A1 | 5/2022 | Gerace | |
| 2022/0373168 | A1 * | 11/2022 | Stallings | F41H 13/0087 |

* cited by examiner

*Primary Examiner* — Tracie Y Green
(74) *Attorney, Agent, or Firm* — CIONCA IP Law P.C.

(57) ABSTRACT

Provided herein is a portable guidelight marker device, having a holder, wherein a first face of the holder is provided with an embedded magnet; wherein a second face of the holder is provided with a hook and loop fastener system; an LED light system having a battery, an LED light, an on switch, an off switch, and an outer casing covering the LED light and at least a portion of the battery; the holder having an internal magnet cavity configured to hold the embedded magnet, and an internal light cavity configured to hold the LED light system; wherein the internal magnet cavity is completely enclosed within the interior of the holder; wherein the internal light cavity is configured to receive and hold the LED light system such that the battery is contained within the interior of the holder and the LED light is situated on the exterior of the holder.

6 Claims, 8 Drawing Sheets

GUIDELIGHT MARKER DEVICE

BACKGROUND OF INVENTION

1. Field of the Invention

The invention relates generally to forensics, law enforcement for tactical operations, and evidence tracking, and the like, and more specifically to lighting devices used for such fields.

2. Description of the Related Art

Generally, in pursuit or tracking scenarios, law enforcement and forensic/crime scene investigators often need a reliable way to mark paths, indicate entry locations, clear rooms, mark search and rescue missions, alert to other investigators of potential threats, and so on. Traditional methods may be inadequate or less efficient, leading to challenges in maintaining situational awareness and coordination among officers.

Some known elements currently available, such as glow sticks or chemlights, are specifically designed to be single-use items, remaining illuminated once activated until the glow cycle concludes. These glow sticks and other such items can be deployed by dropping, placing, or throwing the items to serve as marking indicator lights. However, after use, these items are disposed of since they cannot be reactivated. These items generally also lack the capability to be attached to some materials such as Velcro® or magnetic surfaces.

Therefore, there is a need for a solution to the above problems.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a guidelight marker device configured to be portable is provided, comprising: a holder having a cuboid shape, a base end, a top end, at least two hollow internal cavities; wherein a first face of the holder is provided with an embedded magnet on an interior of the holder; wherein a second face of the holder is provided with hook and loop fasteners on an exterior of the holder; an LED light system having a battery, an LED light, an on switch, an off switch, and an outer casing covering the LED light and at least a portion of the battery; the at least two hollow internal cavities comprising: an internal magnet cavity configured to hold the embedded magnet, and an internal light cavity configured to hold the LED light system; wherein the internal magnet cavity is completely enclosed within the interior of the holder; wherein the top end of the holder comprises an opening providing access from the exterior of the holder to the internal light cavity, and such that the internal light cavity is configured to receive and hold the LED light system such that the battery is contained within the interior of the holder and the LED light is situated on the exterior of the holder on the top end of the holder.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
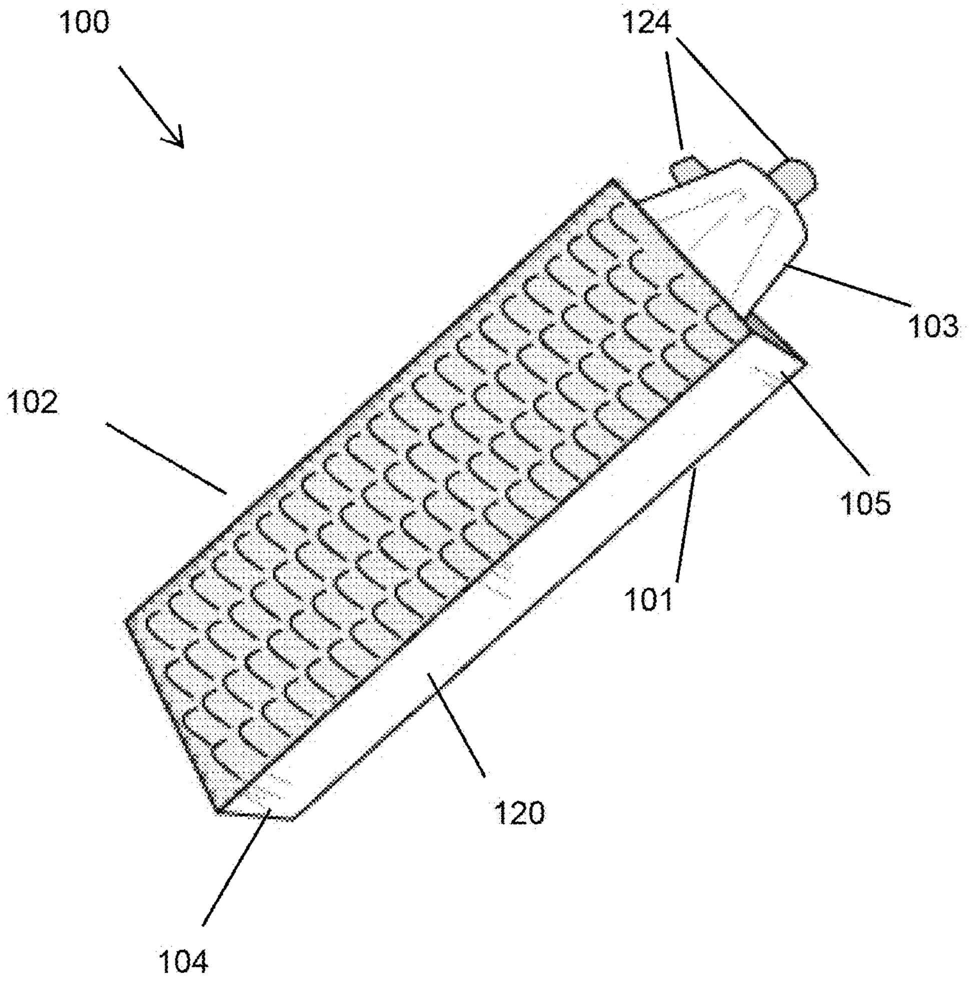
FIG. 1 depicts a perspective view of a front side of a guidelight marker device, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 105 and 205, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 depicts a perspective view of a front side of a guidelight marker device 100, according to an aspect. In some embodiments, the guidelight marker devices (referred to herein as "guidelight marker device," "guidelight marker," "marker device," or "light device") provided herein comprise a device body 100, which may be substantially rectangularly shaped and extending between a base end 104 and a light end 105. The device 100 may be provided with hook Velcro® 102 along one side of the holder or body 120. In some embodiments, the hook Velcro 102 is provided on one or more sides of the body. The light end 105 may be provided with a light 103, which may be an LED light, and on/off switches 124. It should be understood that the on/off switches 124 may be provided in any suitable configuration, such as a single switch or button, or multiple switches or buttons, for example. Generally, the devices provided herein may be provided with a cuboid shape but it should be understood that any suitable shape could be used, such as cylindrical and so on.

Generally, the marker devices provided herein are small, portable, compact light devices that can, for example, be used in dark environments to help indicate areas of interest when collecting crime scene evidence, marking locations or routes, or following moving people or objects. The marker devices are generally provided as a holder (also referred to herein as a device body) and a light. The holder may be constructed from any suitable durable material, and may have Velcro and magnets incorporated into the body of the outer casing. As examples, the holder may be constructed from materials such as TPR, TPU, TPE, silicone, rubber, and so on, or any combination thereof.

Due to the small size of the device, it can be used to mark individual particular locations and items. Exemplary dimensions of the device are 5×1×1.5 cm. It should be understood that the devices can be provided in other suitable dimensions. The devices provided herein are capable of being thrown and dropped, and affixed to various surfaces such as hook and loop (such as Velcro®) surfaces or metal surfaces.

Generally, the lights provided with the marker devices disclosed herein are reusable. As an example, the LED lights provided with the devices can provide light for up to approximately 36 hours.

Figure 2:
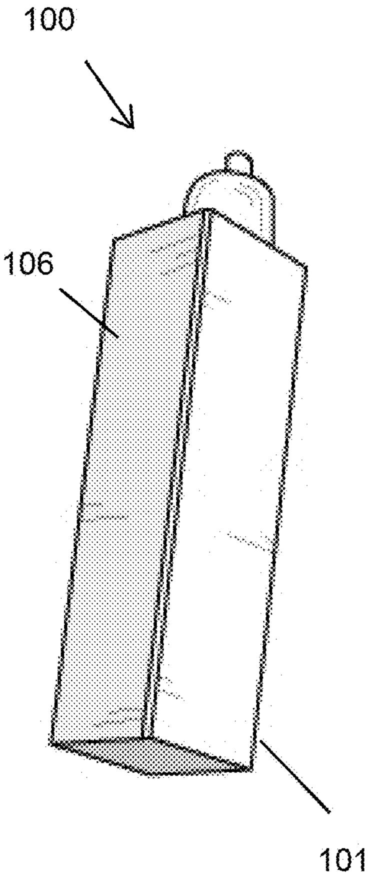
FIG. 2 depicts a perspective view of a rear side of a guidelight marker device, according to an aspect.

FIG. 2 depicts a perspective view of a rear side of a guidelight marker device 100, according to an aspect. In some embodiments, the guidelight marker devices provided herein are provided with an embedded magnet 106 on at least one side of the device body 101.

Figure 3A:
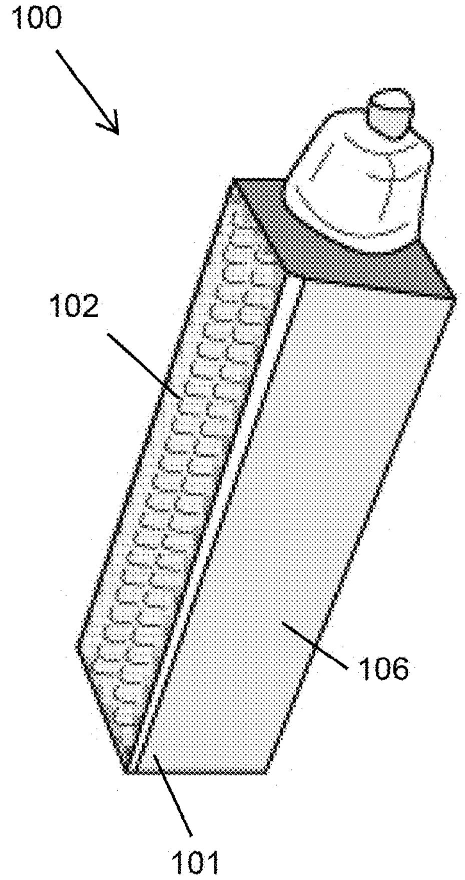
FIGS. 3A-3B depict a side perspective view and a top perspective view, respectively, of a guidelight marker device, according to an aspect.
Figure 3B:
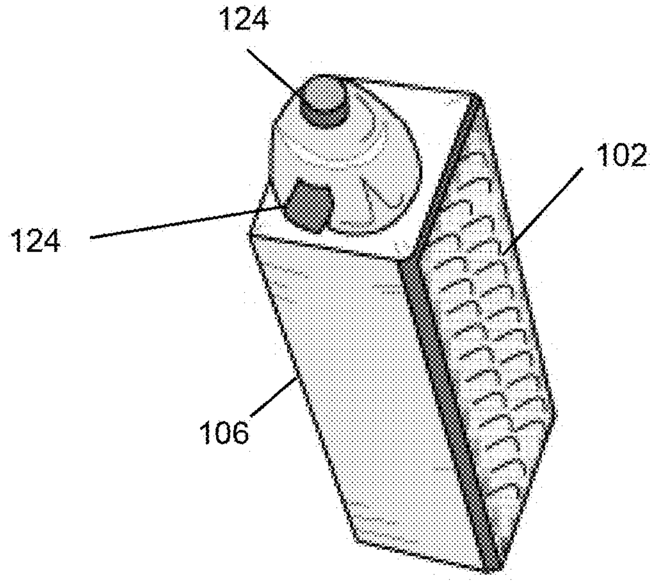

FIGS. 3A-3B depict a side perspective view and a top perspective view, respectively, of a guidelight marker device 100, according to an aspect. In some embodiments, the guidelight marker devices provided herein are provided with an embedded magnet 106 on at least one side of the device body 101, and hook and loop fasteners such as Velcro® 102 on at least one other side of the device body. In some embodiments, hook fasteners are provided on the device for pairing with other surfaces having loop fasteners. Also shown in the top perspective view are on/off buttons 124.

Figure 4:
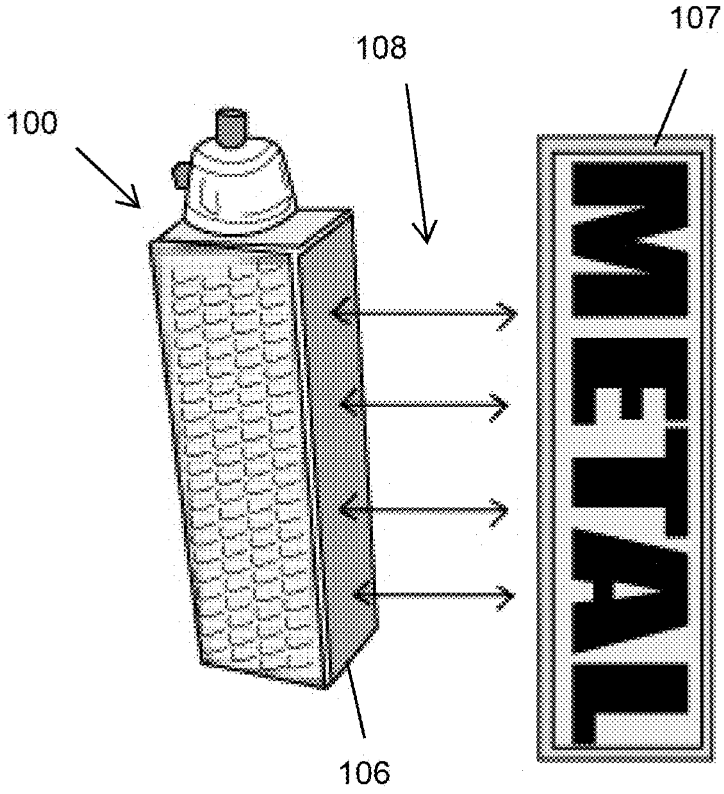
FIG. 4 depicts a side perspective view of a guidelight marker device having an embedded magnet, according to an aspect.

FIG. 4 depicts a side perspective view of a guidelight marker device 100 having an embedded magnet 106, according to an aspect. In some embodiments, the marker devices provided herein can be attached to metal surfaces 107 via magnetic force 108.

In some embodiments, the guidelight marker devices provided herein can be dropped on the ground, attached to loop Velcro®, or be placed on any metal object to mark paths taken during pursuits, providing a clear visual marking and trail for officers or any other persons who need to view information about a pursuit, crime scene, or the like. In some embodiments, the marker devices provided herein can be affixed to stationary items to give directions on a path, and can also be attached to mobile items such as being affixed onto or carried by a person, or to a mobile metal object. This can allow for providing a visual indicator for tracking or following movement. As an example, the devices can be carried on a person by affixing to a Velcro loop, magnetic object, or the like.

In some embodiments, the marker devices provided herein can alert people to areas that have already been searched or mark locations/routes during missions. This can be helpful during search and rescue type operations, or the like.

In some embodiments, the marker devices provided herein can be used for entry location marking. For example, when entering buildings, users can attach the product to specific doors or rooms to mark entry points, indicate cleared areas, or signal potential threats.

In some embodiments, the marker devices provided herein can be easily affixed to vehicles, enabling aerial units to identify and track suspect vehicles during pursuits. In such embodiments, the marker devices may be capable of producing one or more of several different colored lights. Different colors can, for example, indicate different vehicle statuses. The color of the lights may, for example, be controlled by a controller switch. In some embodiments, the markers are provided with multiple controller switches for switching the lights on/off or adjusting the color. In some embodiments, each device is configured to emit only one color of light. In some embodiments, colors can be an indicator of a particular status, such as danger, safety, ally, foe, and so on. In some embodiments, any other suitable use of the marker devices such as flashing lights, differently colored lights, and so on could be used as a status indicator. In such embodiments, a user can assign a particular status to a guidelight marker device and identify the status of a person, location, point of interest, and so on by visually checking the device.

In some embodiments, the marker devices provided herein can be used for crime scene marking. For example, the marker devices can be placed to indicate locations of evidence, making it easier for forensic teams or other users to identify and collect crucial information. In such embodiments, the marker devices can also be used to segment and identify different areas within a scene or area, which can help users maintain organization and clarity during complex operations.

In some embodiments, egress routes can be marked using the marker devices provided herein. During evacuations from buildings or other areas, the marker devices can be placed to quickly illuminate and indicate routes for safe evacuation.

Figure 5:
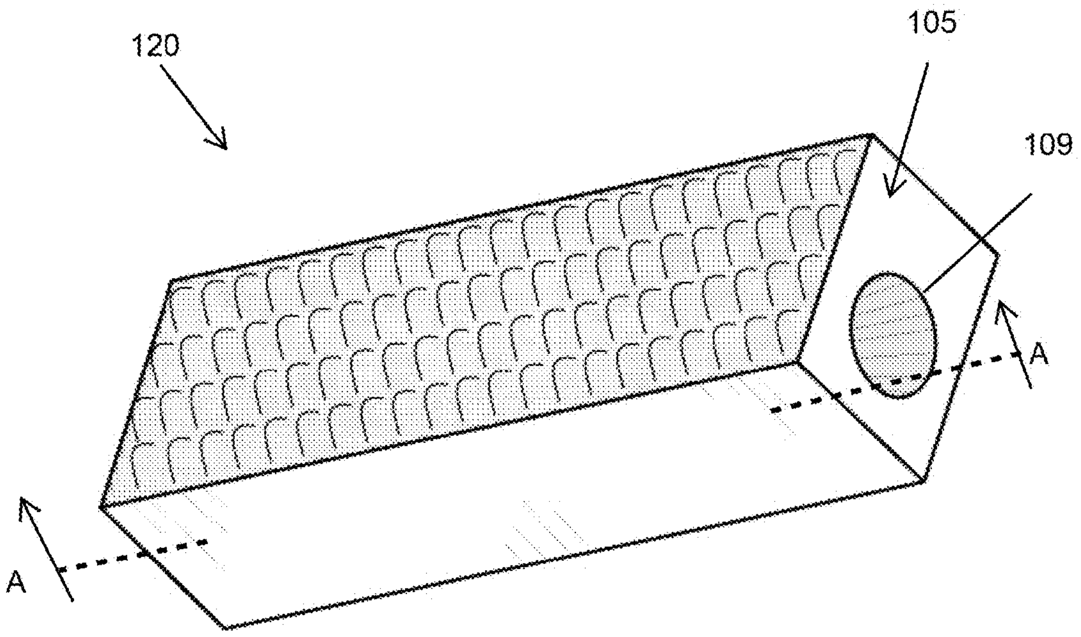
FIG. 5 depicts a top, side perspective view of the holder of the guidelight marker devices provided herein, having an internal light cavity for a light system, according to an aspect.

FIG. 5 depicts a top, side perspective view of the holder 120 of the guidelight marker devices provided herein, having an internal light cavity 109 for a light system, according to an aspect. For visual clarity, the holder 120 shown in FIG.

5 and FIG. 6 described below are shown without the LED light. The top or light end 105 of the marker devices provided herein may include an internal light cavity 109 having an opening at the light end 105, within which a light system can be placed. In such embodiments, the light system securely contained in the holder and cannot be removed by the user. Therefore, the device is securely provided as a single unit where elements cannot be lost or removed. It should be understood that the devices provided herein could be configured such that the light system is or is not removable from the holder.

Figure 6:
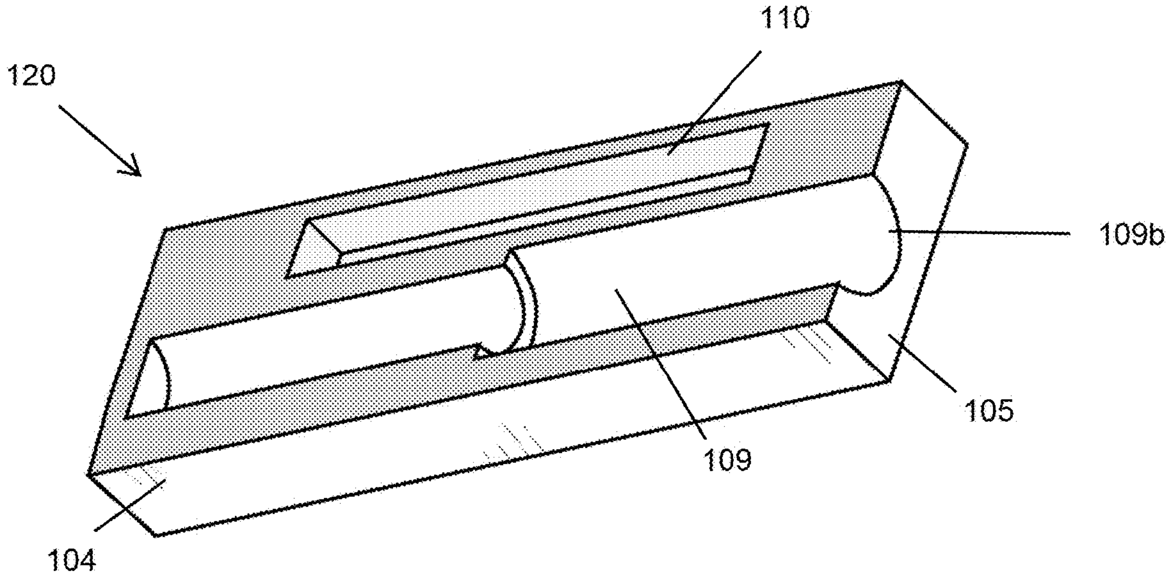
FIG. 6 depicts a sectional view of a guidelight marker device along line A-A of FIG. 5, looking in the direction of the arrows, according to an aspect.

FIG. 6 depicts a sectional view of a guidelight marker device 100 along line A-A of FIG. 5, looking in the direction of the arrows, according to an aspect. The inside of the guidelight marker devices provided herein may be provided with two cavities: an internal light cavity 109, and an internal magnet cavity 110. The internal light cavity 109 may extend from the base end 104 to the light end 105. In such embodiments, the internal light cavity 109 has an opening at the light end (109*b*). The internal magnet cavity 110 may be completely enclosed within the interior of the guidelight marker device 100, with no openings to the exterior of the device.

In some embodiments, the marker devices provided herein are provided with battery-operated lights that can be turned on and off, and are reusable. The lights can be reactivated rather than being single-use. Generally, the light of the devices provided herein can be activated and displayed quickly, to give a visual communication for coordination with other people. The lights can also indicate distress, movement cues, and alerts. In some embodiments, these indications can be provided by the light alone with no need for audio indicators.

In some embodiments, the light of the devices provided herein can be activated prior to the device being thrown into an area. For example, the light can be activated and thrown into an area with unknown threats. This can serve as a distraction for threats/suspects in the room or other area allowing for a safer entry by the user.

Figure 7A:
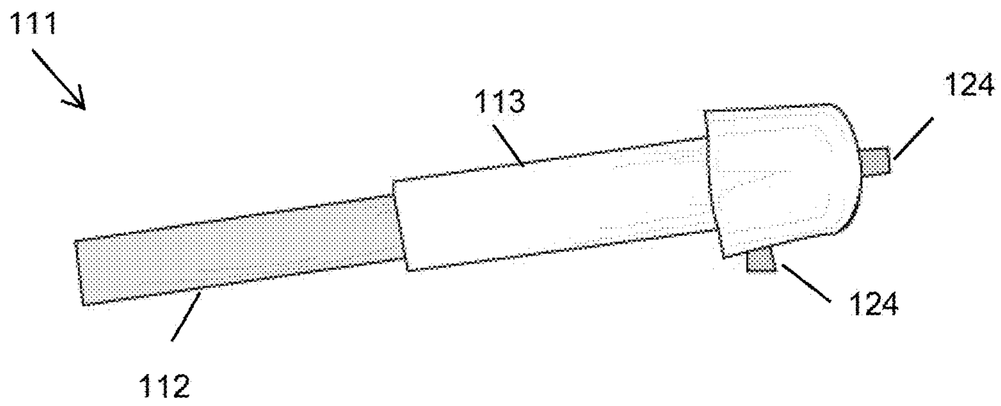
FIGS. 7A-7B depict a side view and a cross-sectional side view, respectively, of a light system that can be used with any of the guidelight marker devices provided herein, according to an aspect.
Figure 7B:
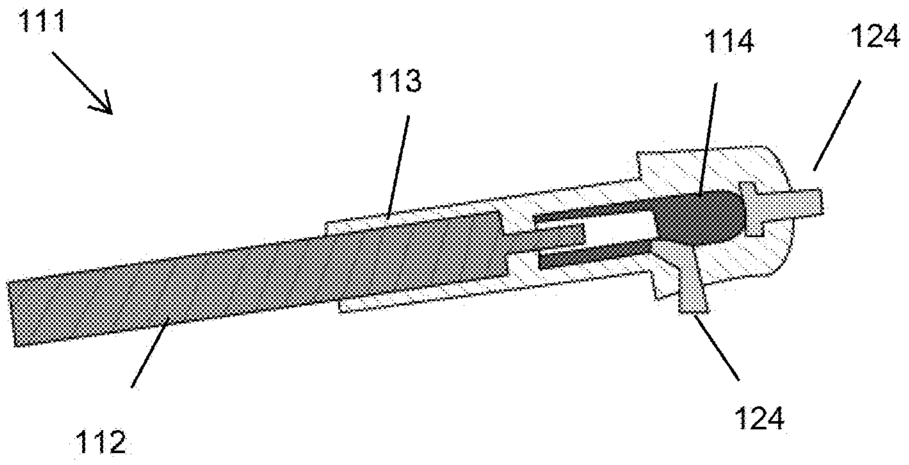

FIGS. 7A-7B depict a side view and a cross-sectional side view, respectively, of a light system 111 (which can also generally be referred to as "light") that can be used with any of the guidelight marker devices provided herein, according to an aspect. In some embodiments, the light system 111 can be placed in the internal light cavity 109 of the holder 120 as shown in FIGS. 5-6. Shown in these views are on/off switches 124, a battery 112, an LED 114, and an outer casing 113 within which some elements of the light system 111 are contained.

Figure 8:
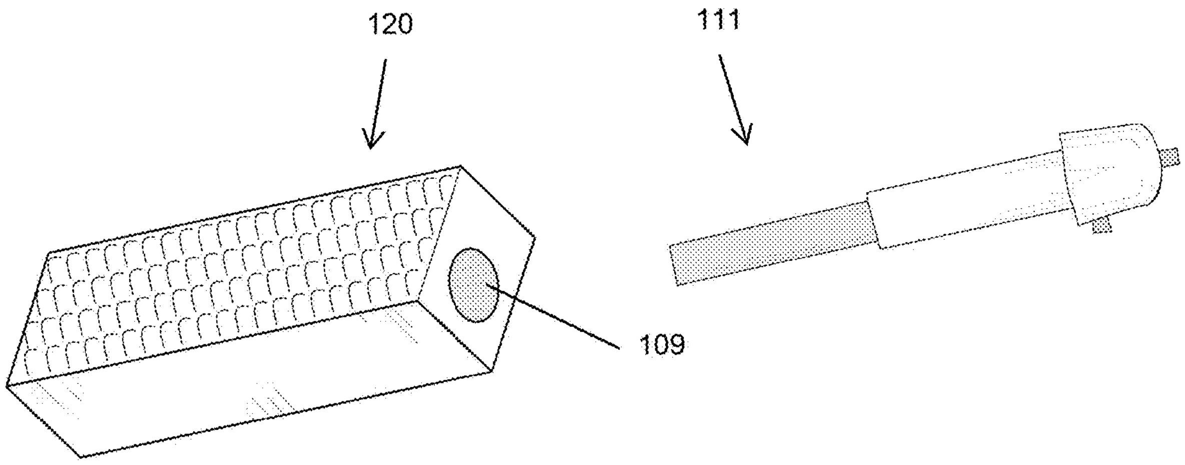
FIG. 8 depicts the holder of the guidelight marker devices provided herein, as shown in FIGS. 5-6, and a light system of the guidelight marker devices provided herein, according to an aspect.

FIG. 8 depicts the holder 120 of the guidelight marker devices provided herein, as shown in FIGS. 5-6, and a light system 111 of the guidelight marker devices provided herein, according to an aspect. FIG. 8 shows how the light system 111 can be inserted into the internal light cavity 109 of the holder 120. The light system 111 is then securely held in place by tight friction and being provided as an exact fit within the receiving cavity, and being constructed from materials that keep each element snug together.

Figure 9:
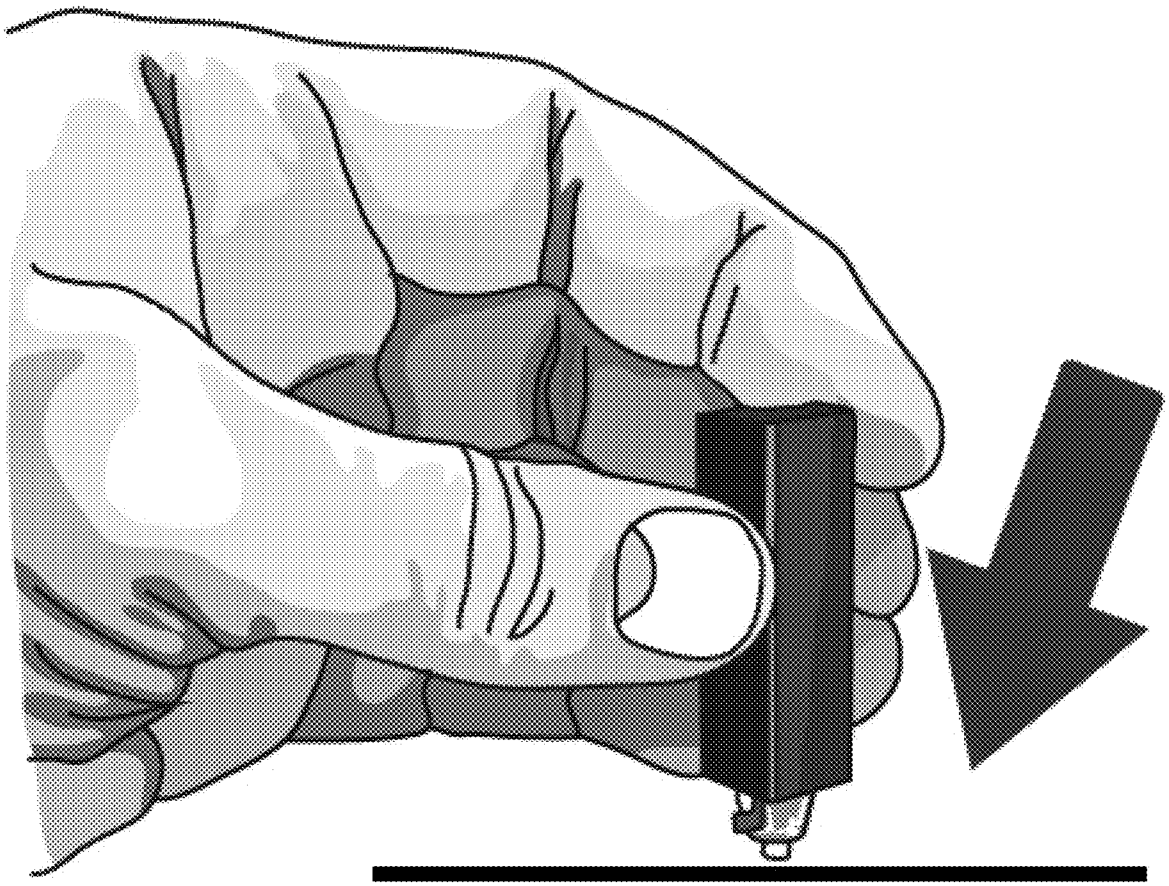
FIG. 9 depicts a guidelight marker device as disclosed herein, demonstrated in use, according to an aspect.

FIG. 9 depicts a guidelight marker device as disclosed herein, demonstrated in use, according to an aspect. In some embodiments, the on/off switch (shown in detail in at least FIG. 1 by switches 124) can be operated by pressing the light end of the device onto any surface, for example.

Figure 10:
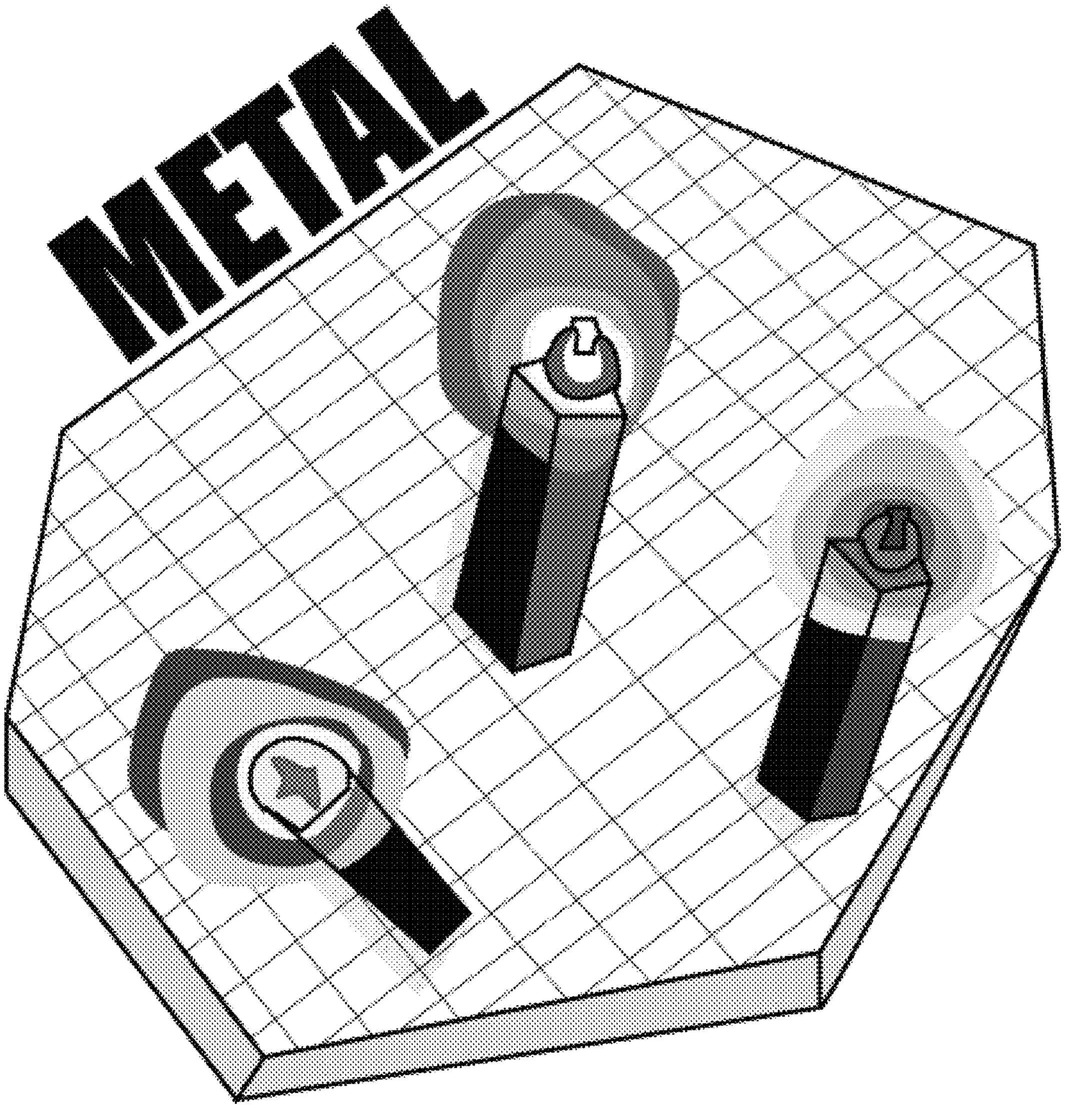
FIG. 10 depicts three guidelight marker devices as disclosed herein, with each of the three devices having a different colored light, according to an aspect.

FIG. 10 depicts three guidelight marker devices as disclosed herein, with each of the three devices having a different colored light, according to an aspect. In some embodiments, the devices provided herein can emit colored lights. In some embodiments, the light is white, green, red, or blue. In some embodiments, the devices provided herein emit only one type of colored light. Also depicted in FIG. 10 is each of the three devices shown being attached to a metallic surface via the embedded magnet of the devices, as described herein above.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A method of marking points of interest in an area using a plurality of guidelight marker devices, each one of the guidelight marker devices comprising:

a holder having a base end, a top end, at least two hollow internal cavities;

wherein a first face of the holder is provided with an embedded magnet on an interior of the holder;

wherein a second face of the holder is provided with a hook and loop fastener system on an exterior of the holder;

an LED light system having a battery, an LED light, an on switch, an off switch, and an outer casing covering the LED light and at least a portion of the battery;

the at least two hollow internal cavities comprising: an internal magnet cavity configured to hold the embedded magnet, and an internal light cavity configured to hold the LED light system;

wherein the internal magnet cavity is completely enclosed within the interior of the holder;

wherein the top end of the holder comprises an opening providing access from the exterior of the holder to the internal light cavity, and such that the internal light cavity is configured to receive and hold the LED light system such that the battery is contained within the interior of the holder and the LED light is situated on the exterior of the holder on the top end of the holder;

the method comprising:

identifying at least one point of interest in the area;

pressing the on switch to activate the LED light;

determining if the at least one point of interest includes a metallic object or hook and loop fasteners and attaching the guidelight marker device via the first face of the holder or the second face of the holder onto the metallic object or the hook and loop fasteners or dropping the guidelight marker device near the point of interest if a metallic object or hook and loop fasteners are not available;

repeating the identifying, pressing, and determining steps for each identified point of interest of the points of interest in an area.

2. The method of claim 1, wherein the points of interest comprise an exit route for an evacuation.

3. The method of claim 1, wherein the points of interest comprise evidence and wherein the area is a crime scene.

4. The method of claim 1, wherein the points of interest comprise a person or vehicle, and the method further comprises following an emitted light provided by at least one of the plurality of guidelight marker devices attached to the person or vehicle.

5. The method of claim 1, wherein the points of interest marked by the plurality of guidelight marker devices provides a predetermined indication to a group of users, the predetermined indication being selected from: safe areas, unsafe areas, areas already checked, and areas not yet checked.

6. The method of claim 1, further comprising:

assigning a status to a guidelight marker device of the plurality of guidelight marker devices, identifying the status by visually checking the plurality of guidelight marker devices dropped, attached to a surface, or worn by a person.

* * * * *